United States Patent [19]
Pilcher et al.

[11] Patent Number: 5,359,348
[45] Date of Patent: Oct. 25, 1994

[54] POINTING DEVICE HAVING IMPROVED AUTOMATIC GAIN CONTROL AND INFORMATION REPORTING

[75] Inventors: L. Stephen Pilcher, N. Ferrisburg; Donald S. Odell, Burlington, both of Vt.

[73] Assignee: Selectech, Ltd., Colchester, Vt.

[21] Appl. No.: 886,087

[22] Filed: May 21, 1992

[51] Int. Cl.⁵ .............................................. G09G 3/02
[52] U.S. Cl. .................... 345/158; 345/157; 359/147
[58] Field of Search .............. 340/709, 707, 706, 712; 359/144, 147; 250/214 AG; 375/22; 358/158; 345/157, 158, 160

[56] References Cited

U.S. PATENT DOCUMENTS

| | | | |
|---|---|---|---|
| 4,210,329 | 7/1980 | Steiger et al. | 273/313 |
| 4,241,456 | 12/1980 | Nakagaki et al. | 455/603 |
| 4,565,999 | 1/1986 | King et al. | 340/706 |
| 4,682,159 | 7/1987 | Davison | 340/709 |
| 4,691,199 | 9/1987 | Shell | 340/710 |
| 4,839,838 | 6/1989 | LaBiche et al. | 364/709.11 |
| 4,897,821 | 1/1990 | Thierry | 359/144 |
| 4,959,721 | 9/1990 | Micic et al. | 358/194.1 |
| 4,987,298 | 1/1991 | Inagaki | 250/214 AG |
| 4,999,617 | 3/1991 | Uemura et al. | 340/706 |
| 5,045,843 | 9/1991 | Hansen | 340/709 |
| 5,113,151 | 5/1992 | Yamamoto | 250/214 AG |
| 5,119,045 | 6/1992 | Sato | 375/22 |

FOREIGN PATENT DOCUMENTS

| | | |
|---|---|---|
| 0209411 | 6/1986 | European Pat. Off. |
| 0134564 | 7/1985 | Japan ........................ 358/158 |
| 60-230228 | 11/1985 | Japan. |

OTHER PUBLICATIONS

Bassen, "An Optically Linked Telemetry Sys. for Use with Electromagnetic-Field Measurement Probes", Nov. 1978, pp. 483–488.

*Primary Examiner*—Alvin E. Oberley
*Assistant Examiner*—Minsun Oh
*Attorney, Agent, or Firm*—Jacobson, Price, Holman & Stern

[57] ABSTRACT

An improved optical pointing device utilizing a moveable unit having a voltage-to-frequency converter (VFC). The VFC emits pulses with separation proportional to the angular rotative and/or translational position of the moveable unit, which pulses are applied to an LED of the moveable unit. A microcomputer in a base unit measures separation of the pulses received by a photodetector to determine the components of the angular rotative and/or translational position of the moveable unit. In accordance with another aspect, automatic gain control circuitry is located in the moveable unit, thereby eliminating the need for two-way communication to achieve consistency of operation in a prescribed space.

16 Claims, 5 Drawing Sheets

POINTING DEVICE HAVING IMPROVED AUTOMATIC GAIN CONTROL AND INFORMATION REPORTING

BACKGROUND OF THE INVENTION

The present invention relates to improvements to a pointing device, such as that disclosed in commonly assigned U.S. Pat. No. 5,045,843, the entirety of which is herein incorporated by reference.

The invention which is the subject of U.S. Pat. No. 5,045,843 satisfies a need for a system facilitating remote control of a cursor on a display screen. FIG. 1 illustrates an example of a basic block diagram of the pointing device, shown at 40, according to the prior patent. A first unit 41, called a fixed unit or base unit, is located proximate the display screen and interconnects with a cursor control circuit 13 associated with the display screen 15, such as a television or a computer display screen.

The fixed unit 41 includes a driver 7 and a first LED 9. A microcomputer 5 controls operation of the driver 7 as well as operation of the cursor control circuit 13. The fixed unit further includes a photodetector 43 connected to the microcomputer 5 via an analog-to-digital converter 16 and a buffer 45.

The movable or remote unit 48 includes a camera 19 having a lens 21, an elongated tube 23 and a position sensing detector 25 connected to operational amplifiers 29. The operational amplifiers 29 amplify the currents received and translate them into proportional voltages. The voltages are digitized by the A/D converter 49 and processed by the microcomputer 51 to control operation of the driver 55 which drives a second LED 57.

In order to compensate for ambient light conditions, the system according to the prior patent performs active dynamic gain control in the fixed unit by two-way ("closed-loop") communication between the fixed unit and the moveable unit. Specifically, the intensity of the light transmitted by the LED of the fixed unit is controlled. This light intensity is proportional to the square of the distance between the fixed unit and the moveable unit. The fixed unit and moveable unit communicate with each other in both directions to establish appropriate illumination levels of the IR LED 9 in the fixed unit. The amplified output signals of the operational amplifiers are then digitized by the A/D converter 49 to allow for processing by the microcomputer 51. The step of digitizing the amplified signal for ultimate transmission is hereinafter referred to as "information reporting".

While the system according to the prior patent adequately performs its desired functions, there is room for improvement. Specifically, it is desirable to eliminate the need for two-way, or closed-loop, communication and to accomplish automatic gain control by adjusting the gain of the operational amplifiers in the moveable unit. It is also desirable to eliminate the A/D conversion in the moveable unit.

SUMMARY OF THE INVENTION

Accordingly, it is an object of the present invention to provide for automatic gain control in an optical pointing device without the need for closed-loop communication between the fixed unit and the moveable unit thus achieving consistency of operation throughout the prescribed space.

It is another object of the present invention to provide a less computationally intensive, and lower power, method and circuit arrangement for reporting the angular rotative and/or translational position of a remote control device.

Briefly, in accordance with one aspect of the present invention, the A/D converter in the moveable unit is replaced with a voltage-to-frequency converter (VFC). The VFC generates pulses with separation proportional to input voltage, which pulses are applied to the LED of the moveable unit. This method consumes much less power to transmit the same amount of data as transmitting the digital values from the A/D converter. The microcomputer in the fixed unit measures the interval between pulses received by the photodetector to determine the relative strength of the voltages output by the operational amplifiers in the moveable unit.

In accordance with another aspect of the present invention, automatic gain control circuitry is located in the moveable unit, thereby eliminating the need for closed-loop communication to adjust the illumination intensity of the IR LED's in the fixed unit as distance between the fixed unit and moveable unit changes during use.

The above and other objects and advantages of the present invention will become more apparent when reference is made to the following description taken in conjunction with the accompanying drawings.

DETAILED DESCRIPTION OF THE DRAWINGS

Figure 1:
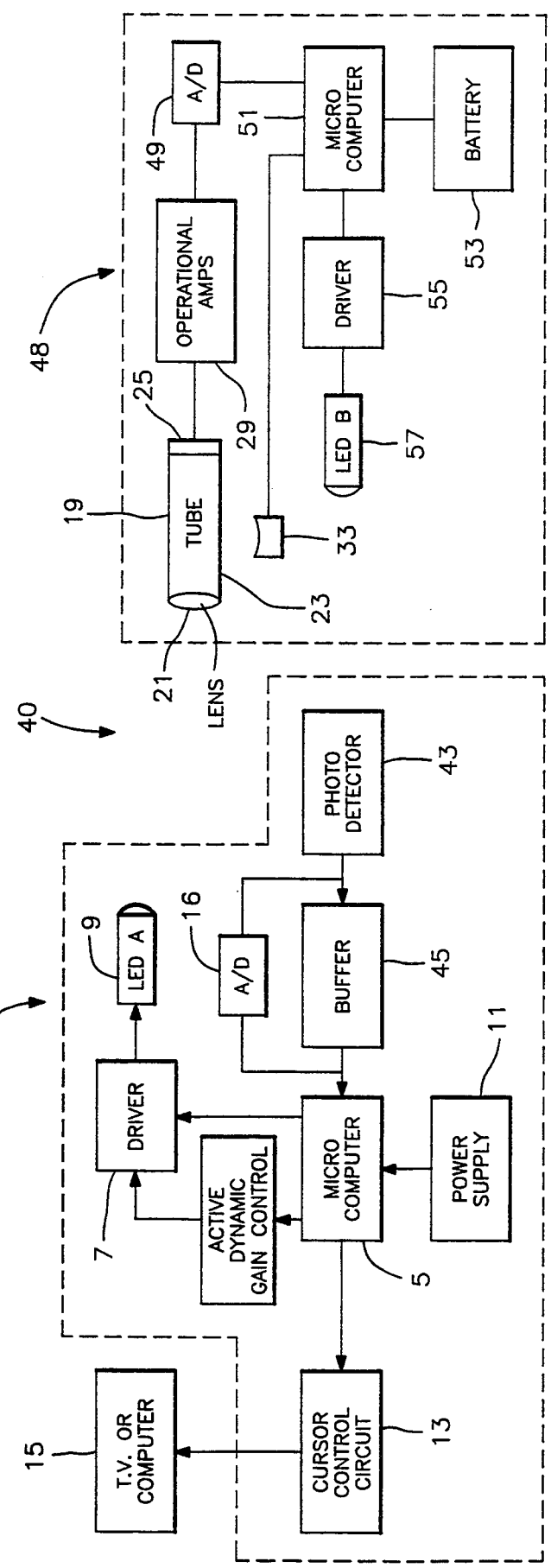
FIG. 1 is a block diagram of pointing system according to the prior art described above.
Figure 2:
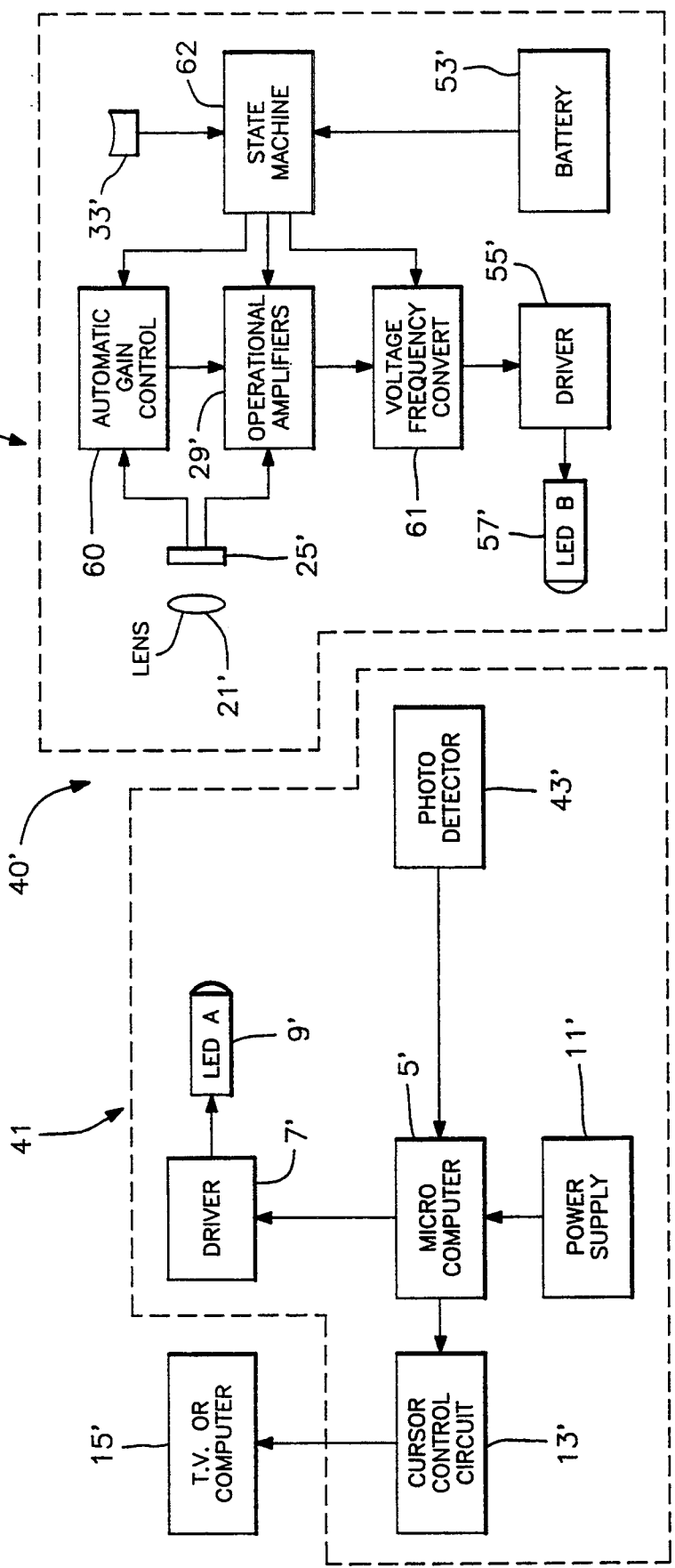
FIG. 2 is a block diagram of the pointing system according to the present invention.

Referring to FIG. 2, the block diagram of the pointing system according to the present invention is shown at 40'. The system 40' is similar to system 40 of the prior patent (FIG. 1) in some respects and like elements are referred to by like primed reference numbers.

As in the prior system the fixed unit 41' includes a driver 7' and a first LED 9'. A microcomputer 5' controls operation of the driver 7' as well as operation of the cursor control circuit 13' of the display device 15'. A power supply 11' provides power to the microcomputer 5'. The fixed unit 41' further includes a photodetector 43' connected to the microcomputer 5'. (The photodetector 43' may be a type which outputs a digital signal, thus eliminating the need for the A/D circuit and buffer shown in FIG. 1.)

The aspect of the present invention dealing with the moveable unit 100 now will be described. Specifically, the moveable unit 100 includes an automatic gain control (AGC) circuit 60, whereas in the prior design the fixed unit contained the active dynamic gain control circuitry. In addition, a voltage-to-frequency converter (VFC) 61 is provided which replaces an analog-to-digital converter to produce the information transmitted by the driver and LED hardware in the moveable unit 100. And finally, a state machine 62 is provided to control the operation of the AGC circuit 60 and the VFC 61, rather than a microcomputer. The state machine provides simple timing to manipulate control lines to the AGC circuit 60 and the VFC 61. A microcomputer is not required since no actual computation is performed.

As in the prior system, the moveable unit 100 includes a camera 19' having a lens 21' and a position sensing detector 25'. These elements are connected to both the AGC circuit 60 and to operational amplifiers 29'. The operational amplifiers are controlled by the AGC circuit 60 and amplify the currents generated by the detector 25' in accordance with the gain set by the AGC circuit 60, and translate these currents into proportional voltages as described with reference to FIGS. 19-21 of the prior patent. The operational amplifiers 29' furnish these amplified signals to the VFC 61 which generates and sends pulses to the driver 55' to activate a second LED 57'. The interval between these pulses is proportional to the voltage supplied by the operational amplifiers 29'. The state machine controls the AGC circuit 60 and the VFC 61. The moveable unit 100 is preferably powered by a battery 53' to allow for portability.

As described above, there are three major improvements to the pointing device: (1) placing the automatic gain control functionality in the moveable unit; (2) using a state machine rather than a microcomputer; and (3) reporting the information detected by the position detector 25 by way of voltage-to-frequency conversion rather than analog-to-digital conversion.

By placing the AGC circuit 60 in the moveable unit, certain advantages are achieved over the prior system. Whereas in the prior system, the active dynamic gain control circuit altered the current applied to the LED 9 (FIG. 1), automatic gain control is performed completely in the moveable unit 100 thus eliminating closed-loop communication necessary in the prior system.

The state machine 62 which replaces the microcomputer 51 (FIG. 1) requires no memory and no calculation is performed by the state machine 62.

The VFC 61 emits pulses with separation proportional to input voltage. These pulses are sent directly to the LED 57' via the driver 55'. The result is that the data stream transmitted to the fixed unit requires less illumination duration by the LED; therefore the LED uses less battery power. The microcomputer 5' can measure the time interval between these pulses received by the photodetector 43' to determine the relative strengths of the voltages output by the operational amplifiers 29'. It is also possible to convert the voltages output by the operational amplifiers 29' to ratios. The pulses sent by the VFC 61 are ratiometric in that case. In any case, a voltage proportional to the total gain applied also must be converted by the VFC 61 and reported to the fixed unit.

Figure 3:
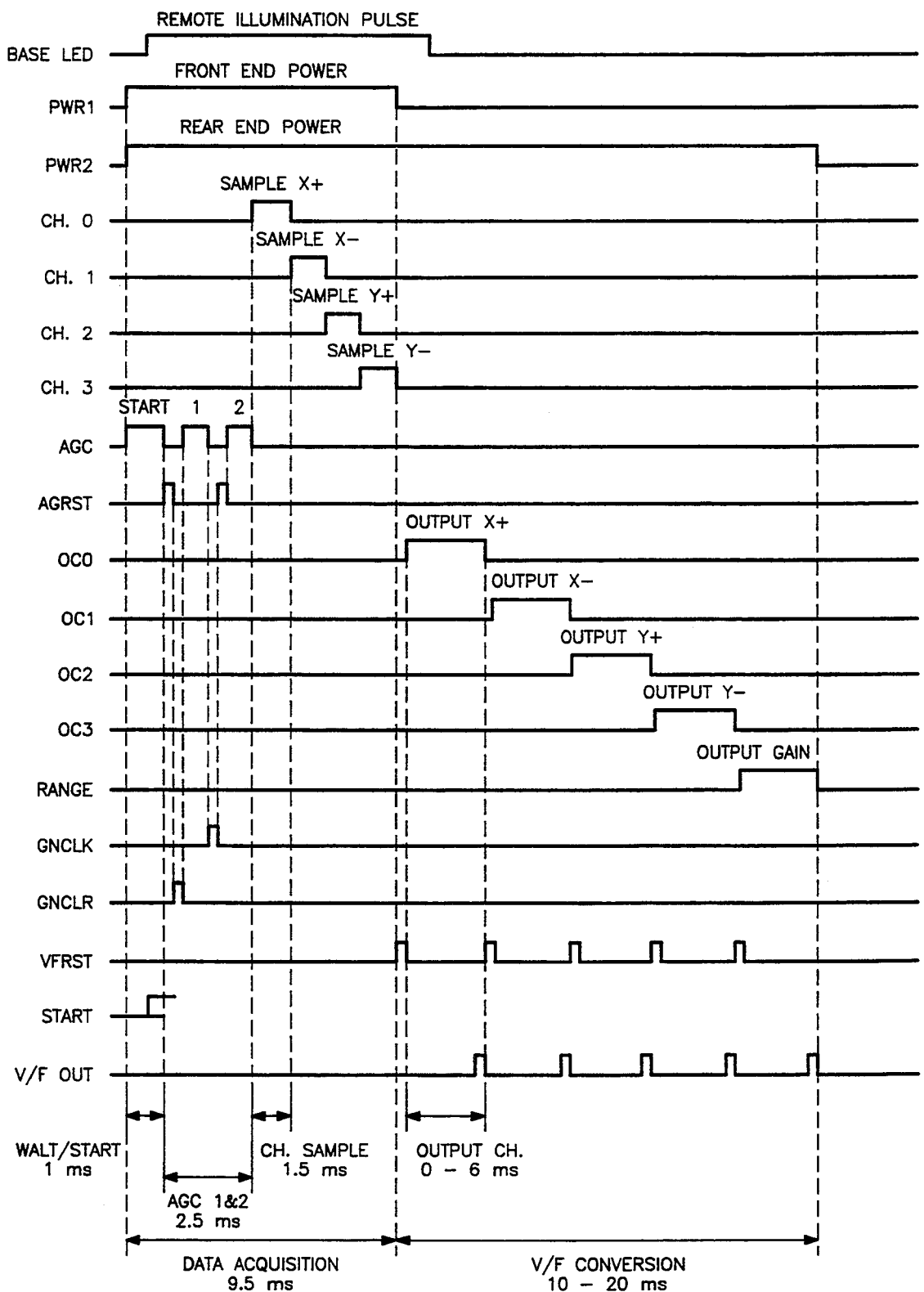
FIG. 3 is a timing diagram of the signals generated in the moveable unit.
Figure 4:
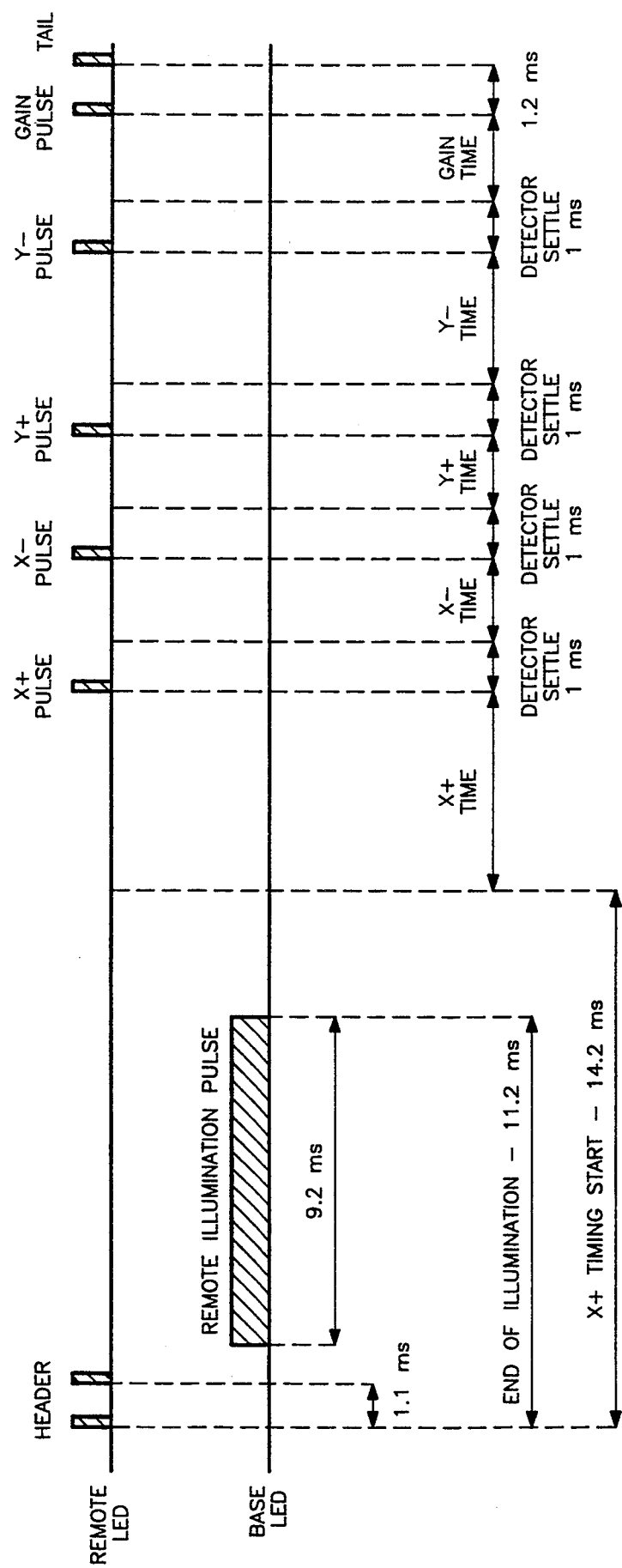
FIG. 4 is a timing diagram illustrating the technique of information reporting according to the present invention.

Referring now to FIGS. 3 and 4 in conjunction with FIG. 2, the operation of the pointing system 40' will be described, first in general terms, then in more detail. First, in general terms, the microcomputer 5' controls the driver 7' to cause the first LED 9' to illuminate in a predetermined manner. This may be by way of signals of any predetermined length, frequency and pattern. Movement of the moveable unit 100 causes the beam of light from the first LED 9' to be focused on the surface of the position sensing detector 25' in a manner corresponding to the angular rotative and/or translational relationship between the orientation of the lens 21 and the fixed position of the first LED 9'.

Signals are generated by the position sensing detector 25' and are conveyed to the AGC circuit 60 which controls the gain of the operational amplifiers 29'. Once the gain has been determined, the state machine 62 causes the signals from the position sensing detector 25' to pass through the operational amplifiers 29' and to the VFC 61. The voltages generated by the operational amplifiers 29' representing each of the components of the angular rotative and/or translational relationship between the fixed unit and the moveable unit and the total gain applied are hereinafter collectively referred to by the term "information signal". The VFC 61 pulses the second LED 57' in a predetermined manner to report the information related to the proportional voltages output by the position sensing detector 25' to the photodetector 43' in the fixed unit 41'. Such signals are conveyed via the microcomputer 5' which receives such signals, and in response, causes the appropriate operation of the cursor control circuit 13' to move the cursor to a position on the screen.

With reference to FIGS. 2-4, the operation of the system 40' will be described in greater detail. The state machine 62 controls operations in the moveable unit 100 and has two modes: normal and powerdown. In the powerdown mode, the state machine in the moveable unit 100 has not received a signal from the fixed unit 41' in a predetermined amount of time. In the powerdown mode, the sampling rate can be slowed or halted to save the battery life. To obtain the normal processing mode, the selector button 33' must be depressed otherwise the slow sampling rate will be in effect until a remote illumination pulse is received from the fixed unit. Communication between the fixed unit 41' and the remote unit 100 is based on timing the intervals between front edges of infrared pulses received by the fixed unit 41'.

Communication may be initiated by either the moveable unit 100 or the fixed unit 41'. In the protocol where the moveable unit initiates, the moveable unit starts by issuing two header pulses of 100 microseconds duration and 1.1 milliseconds separation. The fixed unit 41' uses the interval of 1.1 milliseconds to detect the request. If the fixed unit 41' detects the header, then 2 milliseconds after the first pulse of the header, the fixed unit 41' emits a 20 kHz modulated infrared pulse for 9.2 milliseconds to illuminate the photodetector of the moveable unit 100.

Meanwhile, in the moveable unit 100, with the state machine in the normal processing mode, PWR1 and PWR2 signals are high for powering the operational amplifiers 29' (front end power) and the VFC 61 and other associated circuits (rear end power), respectively. Once an infrared pulse is received, the state machine 62 activates the AGC circuit 60 to set the gain of the operational amplifiers 29' so that the voltages supplied to the VFC 61 are within a predetermined range. The state machine 62 controls the AGC circuit 60 to set the gain of the operational amplifiers 29'. This is done by way of the AGC, AGRST, GNCLK and GNCLR pulses and includes selection of one of two gain levels.

Once the gain of the operational amplifiers is set by the AGC circuit 60, individual detector signals (X+, X−, Y+, Y−) are gated sequentially to the operational amplifiers 29' for generating a voltage. These voltages are stored in capacitors for conversion by the VFC 61. Each of the samples X+, X−, Y+, and Y− is assigned to distinct channels.

All four voltages which are sampled are supplied to the VFC 61. A VFRST pulse is generated by the state machine 62 before each of the voltages is output sequentially to the VFC 61 (OC0, OC1, OC2 and OC3) which in response generates pulses on the V/F OUT pin separated by time intervals proportional to the magnitude of the various voltages. In addition, together with the pulses representing the position detector voltages, the gain set by the AGC 60, called GAIN, is also converted by the VFC 61 to a time interval between successive pulses on V/F OUT. V/F OUT is supplied to the driver 55' which in turn drives the LED 57' to transmit the infrared pulses representative of V/F OUT.

Referring to FIG. 4, the signals detected by the position detector 25' (and converted to pulses) consists of give values: X+, X−, Y+, Y− and GAIN. This data is transmitted by the LED 57' using the pulse separation modulation scheme described above. The first value sent is X+. The timing for X+ starts at 14.2 milliseconds from the first of the header pulses. The moveable unit 100 will send a 100 microsecond pulse at 14.2 milliseconds+(25 microseconds multiplied by X+). This is called the X+ pulse. The fixed unit 41' determines the value for X+ by measuring the difference in time between the first of the header pulses and the rising edge of the X+ pulse subtracting 14.2 milliseconds and dividing by 25 microseconds. The value X− is timed based on the X+pulse plus the maximum settle time of the photodetector 43' which is 1 millisecond. X− is calculated as the X− pulse separation from the X+ pulse less 1 millisecond divided by 25 microseconds Y+, Y− and GAIN are similarly determined by the fixed unit.

To ensure that stray infrared pulses do not interfere with the communication, a TAIL pulse is sent by the moveable unit 100 1.2 milliseconds after the last piece of data (GAIN). The moveable unit 100 sends a total of eight 100 microsecond pulses if no switch pulls are detected and the remote illumination pulse is detected.

These pulses are received by the photodetector 43' in the fixed unit and supplied to the microcomputer 5'. In the fixed unit 41' the raw values X+, X−, Y+, Y− and GAIN are transformed into X and Y coordinates. This is accomplished by the microcomputer 5' using a simple ratio of the difference over the sum multiplied by a constant. The constant L represents a performance factor of the lens 21'. For example, for an X coordinate space of 0 to 32,768, $X=L[(X+-X-)/(X++X-)]16,384+16,384$. The microcomputer 5' is activated to control the cursor control circuit 13' to move a cursor to a position aligned with the angular rotative and/or translational position of the moveable unit.

Figure 5:
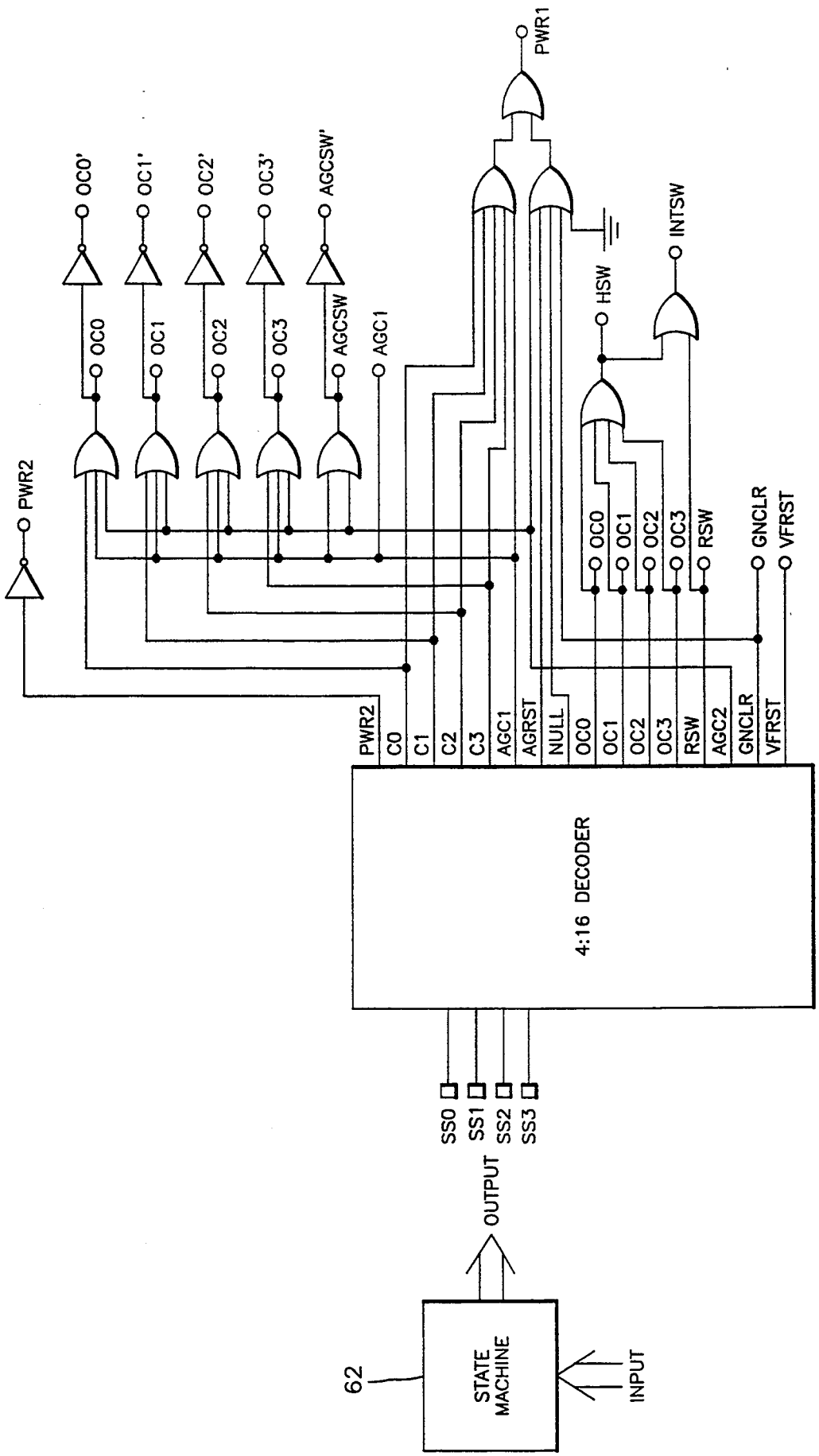
FIG. 5 is a block diagram of the state machine and associated logic circuitry in the moveable unit.

FIG. 5 is a schematic diagram of the state machine, associated decoder and logic circuitry for generating the various control signals for controlling the operational amplifiers 29', AGC circuit 60 and VFC 61. The state machine is driven by the START signal which is generated in response to receipt of the remote illumination pulse (FIG. 3).

The technique of reporting data related to the orientation of the moveable unit relative to the fixed unit is also useful in pointing devices in which communication is by way of nonoptical means. In this regard, the moveable unit need only have some means of determining the angular rotative and/or translational position of the moveable unit.

The above description is intended by way of example only and is not intended to limit the present invention in any way except as set forth in the following claims.

We claim:

1. A pointing device for use within a prescribed space and adapted to be interconnected with a display device having a display screen, a cursor movable on said display screen and a cursor control circuit for controlling the position of the cursor on said display screen, the pointing device comprising:
   a first unit including computer means connected to said cursor control circuit;
   a second unit movably contained within said space and comprising orientation detection means for detecting angular rotative and/or translational position and generating an information signal representative of a plurality of components of said angular rotative and/or translational position, means for converting the information signal to a series of spaced component pulses which are equal in number to the plurality of components, the time spacing between any two consecutive component pulses being proportional to a particular component of the angular rotative and/or translational position.

2. The device of claim 1, wherein the second unit comprises transmission means for transmitting the series of component pulses to the computer means of the first unit, and the computer means of the first unit converts the series of component pulses to cursor control data which is supplied to the cursor control circuit.

3. The device of claim 2, wherein the first unit comprises light detection means connected to said computer means, and the transmission means of the second unit comprises optical transmission means for transmitting the series of component pulses to first unit.

4. The device of claim 1, wherein said first unit comprises a fixedly located light source and the orientation detection means of the second unit comprises light detector means for detecting light emitted from said light source and in response generating as output the information signal which represents components of the angular rotative and/or translational relationship between the light source and the light detector means.

5. The pointing device of claim 1, wherein said means for converting receives as input the information signal in the form of a predetermined number of voltage signals each voltage signal representing one of said components, the series of pulses further comprising a lead pulse, and a tail pulse, the time spacing between a first component pulse and the lead pulse representing a first voltage signal, and the time spacing between succeeding consecutive pairs of said component pulses representing the remaining voltage signals.

6. A method for communicating the angular rotative and/or translational position of a moveable unit within a prescribed space to a receiving unit for interconnection with a display device having a display screen, a cursor movable on said display screen and a cursor control circuit for controlling the position of the cursor on said display screen, the method comprising the steps of:
   detecting the angular rotative and/or translational position of the moveable unit;
   generating an information signal which is indicative of a plurality of components of the angular rotative and/or translational position of the moveable unit;
   converting the information signal into a series of spaced component pulses which are equal in number to the plurality of components, the time separation between any two consecutive component pulses being representative of a particular component of the angular rotative and/or translational position of the moveable unit; and transmitting the series of component pulses from the moveable unit to the receiving unit.

7. The method of claim 6, wherein the step of transmitting comprises the step of generating a series of light pulses which are transmitted to the receiving unit from the moveable unit.

8. The method of claim 6, and further comprising the steps of converting the series of component pulses received by the receiving unit to cursor control data and supplying the cursor control data to the cursor control circuit.

9. The method of claim 8, wherein the step of transmitting comprises the step of transmitting a series of light pulses to the receiving unit.

10. The method of claim 1, wherein said step of detecting the angular rotative and/or translational position of the moveable unit comprises detecting light emitted from a fixedly located light source at said receiving unit and in response generating as output the information signal which represents components of the angular rotative and/or translational position of the moveable unit.

11. A method for communicating the angular rotative and/or translational position of at least one moveable unit within a prescribed space to a receiving unit or to another moveable unit, the method comprising the steps of:

detecting the angular rotative and/or translational position of the at least one moveable unit;

generating an information signal which is indicative of a plurality of components of the angular rotative and/or translational position of the at least one moveable unit;

converting the information signal into a series of spaced component pulses which are equal in number to the plurality of components, the time separation between any two consecutive component pulses being representative of a particular component of the angular rotative and/or translational position of the at least one moveable unit; and transmitting the series of pulses from the moveable unit to the receiving unit.

12. The method of claim 11, wherein the step of transmitting comprises the step of generating a series of light pulses which are transmitted from the moveable unit to the receiving unit or to another moveable unit.

13. An improvement to an optical pointing device for use within a prescribed space for interconnection with a display device having a display screen, a cursor movable on said display screen and a cursor control circuit for controlling the position of the cursor on the display screen, the optical pointing device comprising a first unit including computer means connected to said cursor control circuit and being fixedly located relative to said display device; and a second unit movably contained within said space and comprising orientation detection means for detecting angular rotative and/or translational position and to generate an information signal representative of a plurality of components of the angular rotative and/or translational position, the improvement comprising:

means for converting the information signal to a series of spaced component pulses which are equal in number to the plurality of components, the time spacing between any two consecutive component pulses being proportional to a particular component of the angular rotative and/or translational position.

14. The improvement of claim 13, wherein said first unit includes a light source controlled by said computer means, and said orientation detection means of said second unit comprises light detector means for detecting light emitted from said light source to generate as output the information signal which represents components of the angular rotative and/or translational position between said light source and said light detector means.

15. The improvement of claim 14, wherein the second unit further comprises optical transmission means for transmitting the series of component pulses to the computer means of the first unit, and the computer means of the first unit converts the series of component pulses to cursor control data which is supplied to the cursor control circuit.

16. The improvement of claim 14, wherein the means for converting receives as input, the information signal which comprises voltage signals representing spatial coordinates indicating the position on said light detector means of a light beam emitted by said light source of said first unit.

* * * * *